United States Patent
Li

(10) Patent No.: US 11,734,976 B2
(45) Date of Patent: Aug. 22, 2023

(54) AUTHORIZATION MANAGEMENT AND AUTHORIZATION REQUEST OF ELEVATOR SERVICE REQUEST

(71) Applicant: Otis Elevator Company, Farmington, CT (US)

(72) Inventor: Kai Li, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 806 days.

(21) Appl. No.: 16/661,680

(22) Filed: Oct. 23, 2019

(65) Prior Publication Data

US 2020/0134953 A1    Apr. 30, 2020

(30) Foreign Application Priority Data

Oct. 24, 2018    (CN) .......................... 201811244843.0

(51) Int. Cl.
*G07C 9/22* (2020.01)
*H04W 4/33* (2018.01)
(Continued)

(52) U.S. Cl.
CPC .............. *G07C 9/22* (2020.01); *B66B 1/3461* (2013.01); *B66B 1/468* (2013.01); *H04W 4/06* (2013.01);
(Continued)

(58) Field of Classification Search
CPC . G07C 9/22; B66B 1/3451; B66B 2201/4676; H04W 4/33; H04W 12/08; H04W 12/63
See application file for complete search history.

(56) References Cited

U.S. PATENT DOCUMENTS

| 6,209,685 | B1 | 4/2001 | Zaharia |
| 6,382,363 | B1 | 5/2002 | Friedli |

(Continued)

FOREIGN PATENT DOCUMENTS

| CN | 103922204 A | 7/2014 |
| CN | 104085748 A | 10/2014 |

(Continued)

OTHER PUBLICATIONS

Indian Examination Report for Application No. 201914039653; dated Dec. 1, 2020; 6 Pages.

(Continued)

*Primary Examiner* — Vernal U Brown
(74) *Attorney, Agent, or Firm* — Cantor Colburn LLP

(57) ABSTRACT

An authorization management and authorization request for an elevator service request, and belongs to the technical field of elevator management. An authorization management system for an elevator service request includes a wireless signal device and an authorization management device; wherein the authorization management system performs the following by a personal mobile terminal entering the coverage of the wireless signal: acquiring an elevator identifier in the wireless signal if the wireless signal is scanned, determining whether to have a corresponding elevator service request authority based on the elevator identifier and the stored authorization configuration information, and if not, providing an input component for the passenger to input an instruction of confirming to make authorization request on the personal mobile terminal, and generating authorization request information based on the instruction input by the passenger; wherein the authorization management device is used for receiving the authorization request information.

22 Claims, 3 Drawing Sheets

(51) Int. Cl.
   *B66B 1/34*      (2006.01)
   *B66B 1/46*      (2006.01)
   *H04W 4/06*      (2009.01)
   *H04W 12/08*     (2021.01)
   *H04W 12/63*     (2021.01)
   *H04W 4/80*      (2018.01)
   *H04W 88/02*     (2009.01)

(52) U.S. Cl.
   CPC ............ *H04W 4/33* (2018.02); *H04W 12/08* (2013.01); *H04W 12/63* (2021.01); *B66B 2201/4638* (2013.01); *B66B 2201/4653* (2013.01); *B66B 2201/4676* (2013.01); *H04W 4/80* (2018.02); *H04W 88/02* (2013.01)

(56) References Cited

U.S. PATENT DOCUMENTS

| | | |
|---|---|---|
| 6,425,460 B2 | 7/2002 | Schuster |
| 6,868,945 B2 | 3/2005 | Schuster et al. |
| 6,986,408 B2 | 1/2006 | Takeuchi |
| 7,377,364 B2 | 5/2008 | Tyni et al. |
| 7,426,981 B2 | 9/2008 | Bacellar et al. |
| 9,594,935 B2 | 3/2017 | Gerstenkorn et al. |
| 9,998,581 B1 | 6/2018 | Noxon et al. |
| 10,068,395 B2 | 9/2018 | Mizon |
| 2016/0376124 A1 | 12/2016 | Bunter et al. |
| 2017/0243417 A1 | 8/2017 | Manikantan et al. |
| 2018/0118511 A1 | 5/2018 | Baldi et al. |
| 2018/0162688 A1 | 6/2018 | Troesch et al. |

FOREIGN PATENT DOCUMENTS

| | | |
|---|---|---|
| CN | 204778091 U | 11/2015 |
| JP | 2001002333 A | 1/2001 |
| WO | 02066357 A1 | 8/2002 |
| WO | 2011102654 A2 | 8/2011 |
| WO | 2014178790 A1 | 11/2014 |

OTHER PUBLICATIONS

European Search Report for application EP 19205210.8, dated Mar. 20, 2020, 40 pages.

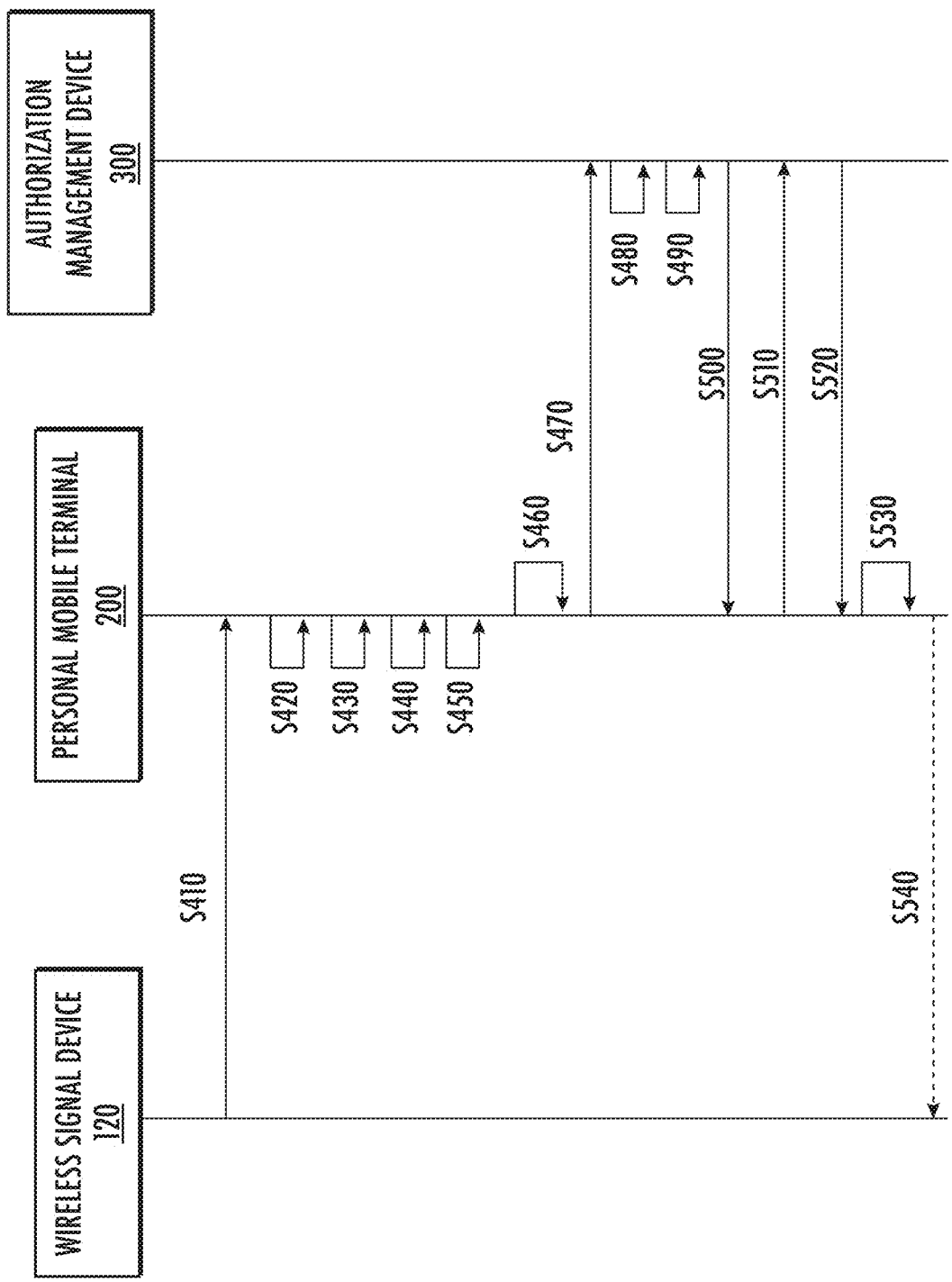

AUTHORIZATION MANAGEMENT AND AUTHORIZATION REQUEST OF ELEVATOR SERVICE REQUEST

CROSS-REFERENCE TO RELATED APPLICATION

This disclosure claims priority to Chinese patent application No. 201811244843.0, filed Oct. 24, 2018, and all the benefits accruing therefrom under 35 U.S.C. § 119, the contents of which in its entirety are herein incorporated by reference.

FIELD OF THE INVENTION

The invention belongs to the technical field of elevator management, relates to authorization management and authorization request for an elevator service request, and particularly relates to a system and method of authorization management for elevator service request, a method of authorization request for elevator service request and a computer readable storage medium thereof.

BACKGROUND OF THE INVENTION

With the development of elevator technology, various techniques for automatically implementing elevator service request operations through personal mobile terminals, such as smartphones, are emerging. However, to facilitate management of elevators, not every passenger has authority to send elevator service request commands to the elevator system through their personal mobile terminals, but only authorized individual mobile terminals can send elevator service request commands to the elevator system generally.

Currently, the entry authority of a certain elevator system or a specific elevator is authorized one by one by the passenger and the management personnel in a face-to-face manner, after which access credentials, e.g. PVC cards and the like, with access authority of the corresponding elevator are issued to the passengers.

SUMMARY OF THE INVENTION

According to a first aspect of the present disclosure, there is provided an authorization management system for an elevator service request, comprising: a wireless signal device mounted in an elevator landing area of an elevator system and for broadcasting a wireless signal containing an elevator identifier of the elevator system; and an authorization management device; wherein the authorization management system performs the following by a personal mobile terminal entering the coverage of the wireless signal: acquiring an elevator identifier in the wireless signal if the wireless signal is scanned, determining whether to have an elevator service request authority of the elevator system based on the elevator identifier and stored authorization configuration information, providing, on the personal mobile terminal, an input component for a passenger to input an instruction of confirming to make an authorization request if not having the elevator service request authority of the elevator system, and generating authorization request information containing a terminal identifier of the personal mobile terminal and an elevator identifier of a corresponding elevator system acquired by the personal mobile terminal based on the instruction input by the passenger; wherein the authorization management device is used for receiving the authorization request information.

The authorization management system according to an embodiment of the present disclosure, wherein the authorization management system further performs the following by the personal mobile terminal: sending remind information to remind the passenger to input an instruction of confirming to make an authorization request if not having the elevator service request authority of the elevator system.

The authorization management system according to another embodiment or any of the preceding embodiments of the present disclosure, wherein the wireless signal device interacts with the personal mobile terminal based on a Location-Marker protocol; the authorization management system further performs the following by the personal mobile terminal: if the wireless signal is scanned, a respective application of the personal mobile terminal is activated by the Location-Marker protocol to perform an operation of determining whether to have an elevator service request authority of the elevator system.

The authorization management system according to another embodiment or any of the preceding embodiments of the present disclosure, wherein the authorization management device comprises: a receiving unit configured to receive the authorization request information from one or more of the personal mobile terminals, wherein the authorization request information includes the elevator identifier and a terminal identifier of the personal mobile terminal that is mapped to the elevator identifier; and an authorization management unit configured to determine whether authorization request information from the corresponding personal mobile terminal is allowed to be authorized based at least on a mapping relationship between the elevator identifier and the terminal identifier in the authorization request information.

The authorization management system according to another embodiment or any of the preceding embodiments of the present disclosure, wherein the authorization management device is configured to be able to return authorization results corresponding to the authorization request information to the personal mobile terminal.

The authorization management system according to another embodiment or any of the preceding embodiments of the present disclosure, wherein the authorization management device is configured to transmit corresponding communication parameters to the personal mobile terminal if it is determined that the authorization request information of the personal mobile terminal is allowed to be authorized, wherein the communication parameter can be used by the personal mobile terminal to automatically establish a communication connection with the wireless signal device.

The authorization management system according to another embodiment or any of the preceding embodiments of the present disclosure, wherein the authorization management system further performs the following by the personal mobile terminal: updating the authorization configuration information based on the authorization result and/or the communication parameter.

The authorization management system according to another embodiment or any of the preceding embodiments of the present disclosure, wherein the wireless signal device is further used to establish a wireless connection with the personal mobile terminal to receive an elevator service request command from the personal mobile terminal.

The authorization management system according to another embodiment or any of the preceding embodiments of the present disclosure, wherein the wireless signal device is a Bluetooth module or a Bluetooth Low Energy (BLE) module for broadcasting a Bluetooth Low Energy signal as the wireless signal.

According to a second aspect of the present disclosure, there is provided an authorization management method for an elevator service request, comprising the steps of: broadcasting, by a wireless signal device installed in an elevator landing area of an elevator system, a wireless signal containing an elevator identifier of the elevator system; acquiring, by a personal mobile terminal, an elevator identifier in the wireless signal if the personal mobile terminal scans the wireless signal; determining, by the personal mobile terminal, whether to have an elevator service request authority of the elevator system based on the elevator identifier and stored authorization configuration information; providing, on the personal mobile terminal, an input component for a passenger to input an instruction of confirming to make an authorization request if not having an elevator service request authority of the elevator system; generating, by the personal mobile terminal, authorization request information containing a terminal identifier of the personal mobile terminal and an elevator identifier of a corresponding elevator system acquired by the personal mobile terminal based on the instruction input by the passenger; and receiving the authorization request information.

The authorization management method according to an embodiment of the present disclosure, further comprising the steps of: sending remind information to remind the passenger to input an instruction of confirming to make an authorization request if not having the elevator service request authority of the elevator system.

The authorization management method according to another embodiment or any of the preceding embodiments of the present disclosure, further comprising the steps of: if the wireless signal is scanned, a respective application of the personal mobile terminal is activated by a Location-Marker protocol to perform an operation of determining whether to have an elevator service request authority of the elevator system, wherein the wireless signal device interacts with the personal mobile terminal based on the Location-Marker protocol.

The authorization management method according to another embodiment or any of the preceding embodiments of the present disclosure, further comprising the steps of: receiving the authorization request information from one or more of the personal mobile terminals, wherein the authorization request information includes the elevator identifier and a terminal identifier of the personal mobile terminal that is mapped to the elevator identifier; and determining whether the authorization request information from the corresponding personal mobile terminal is allowed to be authorized based at least on a mapping relationship between the elevator identifier and the terminal identifier in the authorization request information.

The authorization management method according to another embodiment or any of the preceding embodiments of the present disclosure, further comprising the steps of: returning, by the authorization management device, authorization results corresponding to the authorization request information to the personal mobile terminal.

The authorization management method according to another embodiment or any of the preceding embodiments of the present disclosure, further comprising the steps of: transmitting corresponding communication parameters to the personal mobile terminal if it is determined that the authorization request information of the personal mobile terminal is allowed to be authorized, wherein the communication parameter can be used by the personal mobile terminal to automatically establish a communication connection with the wireless signal device.

The authorization management method according to another embodiment or any of the preceding embodiments of the present disclosure, further comprising the steps of: updating the authorization configuration information based on the authorization result and/or the communication parameter.

The authorization management method according to another embodiment or any of the preceding embodiments of the present disclosure, wherein the wireless signal is a Bluetooth Low Energy signal.

According to a third aspect of the present disclosure, there is provided an authorization request method for an elevator service request, comprising the steps of: acquiring an elevator identifier in the wireless signal if the wireless signal is scanned; determining whether to have an elevator service request authority of the elevator system based on the elevator identifier and stored authorization configuration information; providing, on the personal mobile terminal, an input component for a passenger to input an instruction of confirming to make an authorization request if not having the elevator service request authority of the elevator system, and generating authorization request information containing a terminal identifier of the personal mobile terminal and an elevator identifier of a corresponding elevator system acquired by the personal mobile terminal based on the instruction input by the passenger.

The authorization request method according to an embodiment of the present disclosure, further comprising the steps of: sending the authorization request information to an authorization management device.

The authorization request method according to another embodiment or any of the preceding embodiments of the present disclosure, further comprising the steps of: sending remind information to remind the passenger to input an instruction of confirming to make an authorization request if not having the elevator service request authority of the elevator system.

The authorization request method according to another embodiment or any of the preceding embodiments of the present disclosure, further comprising the steps of: if the wireless signal is scanned, a respective application of the personal mobile terminal is activated by the Location-Marker protocol to perform an operation of determining whether to have an elevator service request authority of the elevator system.

The authorization request method according to another embodiment or any of the preceding embodiments of the present disclosure, further comprising the steps of: updating the authorization configuration information based on the received authorization result and/or the communication parameter.

According to a fourth aspect of the present disclosure, there is provided a computer readable storage medium having stored thereon a computer program, wherein the program is executable by a processor to implement the steps of the authorization request method of any of the preceding third aspect.

The above features and operations of the present invention will become more apparent from the following description and the accompanying drawings.

BRIEF DESCRIPTION OF THE DRAWINGS

The above and other objects and advantages of the present invention will become more complete and clear from the following detailed description taken in conjunction with the drawings, wherein like or similar elements are designated by like numerals.

FIG. 3 is a flowchart of an authorization management method for an elevator service request according to an embodiment of the invention.

DETAILED DESCRIPTION OF THE EMBODIMENT(S) OF THE INVENTION

The present invention will be now described more completely with reference to the accompanying drawings, in which exemplary embodiments of the invention are shown. This invention may, however, be realized in many different forms and should not be construed as limited to the embodiments set forth herein. Rather, these embodiments are provided so that this disclosure will be thorough and complete, and will fully convey the concept of the invention to those skilled in the art.

Some block diagrams shown in the figures are functional entities and do not necessarily have to correspond to physically or logically individual entities. These functional entities may be implemented in software form or in one or more hardware modules or integrated circuits, or these functional entities may be implemented in different processing devices and/or microcontroller devices.

In view of the shortcomings of the existing complex authorization process, poor flexibility, relatively poor passenger experience and the like, there is a need for improving authorization aspects of elevator service requests.

Figure 1:
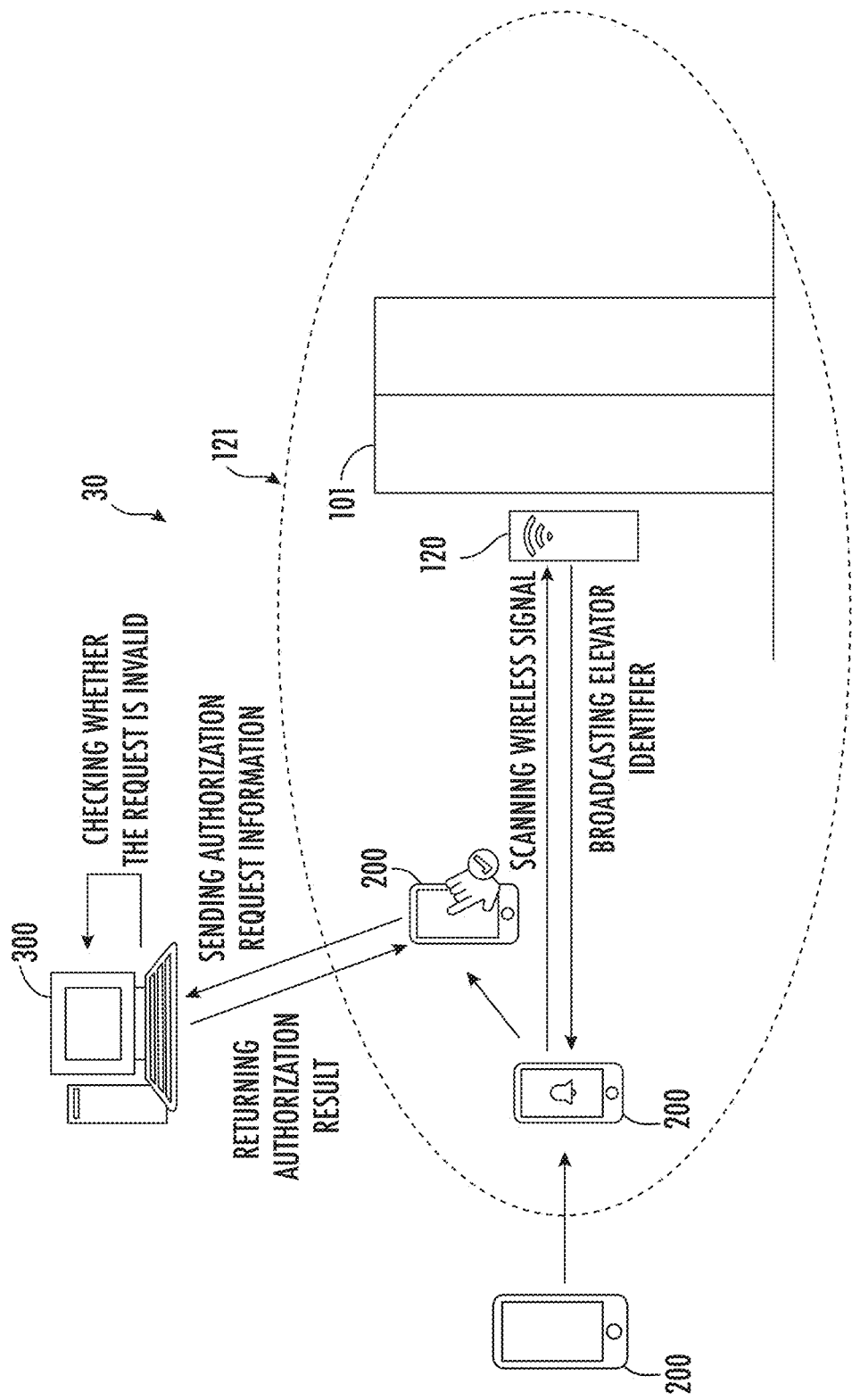
FIG. 1 is a schematic diagram of an authorization management system according to an embodiment of the invention in which an authorization management device for an elevator service request according to an embodiment of the invention is used.
Figure 2:
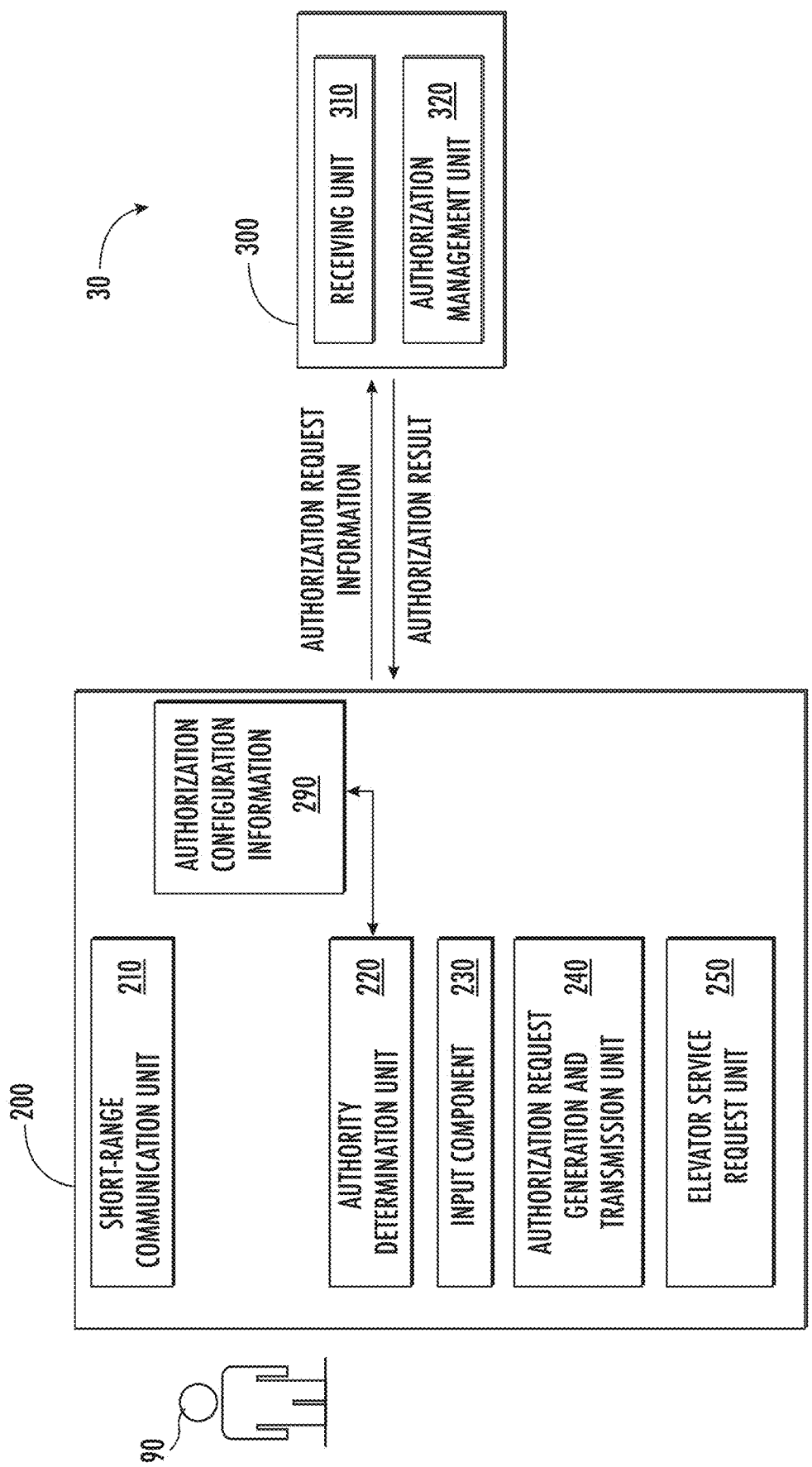
FIG. 2 is a schematic diagram of the module structure of a personal mobile terminal and an authorization management device used by an authorization management system according to an embodiment of the invention.

FIG. 1 is a schematic diagram of an authorization management system according to an embodiment of the present invention in which an authorization management device for an elevator service request according to an embodiment of the present invention is used; FIG. 2 is a schematic diagram of the module structure of a personal mobile terminal and an authorization management device used by the authorization management system according to an embodiment of the present invention. The authorization management system 30 and the authorization management device 300 of an embodiment of the present invention are described in detail below in conjunction with FIGS. 1 and 2.

Wherein, the authorization management system 30 of embodiments of the present invention may manage the elevator system 101 installed or running in a plurality of buildings (e.g., a certain cell), for example authority management for passengers 90 to access a respective elevator system, and/or for the personal mobile terminal 200 of the passenger 90 to automatically send an elevator service request command to the elevator system 101.

It will be appreciated that in the present application, each elevator system may be differentiated or identified by a respective elevator identifier, e.g., an elevator system of a different building of the same cell is assigned a corresponding elevator identifier by management personnel, respectively, and the elevator identifier may be, but is not limited to being implemented by a universally unique identifier (UUID); of course, different elevator identifiers can also be employed to differentiate between different elevators of the same elevator system as desired. Also, the elevator identifier assigned to each elevator system or elevator may be pre-stored in, for example, the authorization management device 300 of the authorization management system 30.

As shown in FIGS. 1 and 2, for each elevator system 101, there is provided a wireless signal device 120 (e.g., the wireless signal device 120 is mounted correspondingly in each elevator landing area of the elevator system 101), the wireless signal device 120 may broadcast a respective wireless signal, such that a wireless signal transmitted or broadcast by the wireless signal device 120 may effectively cover substantially at least each elevator landing area. FIG. 1 schematically illustrates the coverage 121 of wireless signals broadcast by the wireless signal device 120, which may be automatically scanned or sensed once the personal mobile terminal 200 carried by the passenger 90 enters the coverage 121.

In one embodiment, the wireless signal device 120 may be a Bluetooth module, specifically a Bluetooth Low Energy (BLE) module, and correspondingly, the wireless signal transmitted or broadcast by the wireless signal device 120 may be a BLE signal, the Bluetooth interactive communication between the wireless signal device 120 and the personal mobile terminal 200 may be performed specifically based on the Bluetooth protocol of Bluetooth4.0. The wireless signal device 120 may also be used to establish a wireless connection (e.g., a Bluetooth connection) with the personal mobile terminal 200 carried by the passenger 90 to receive an elevator service request command from the personal mobile terminal 200, thereby facilitating the passenger 90 to complete an elevator service request (e.g., a call request) through the personal mobile terminal 200 without operation.

It will be appreciated that when the wireless signal device 120 selects to use a Bluetooth module, the Bluetooth module may establish a Bluetooth connection with each of a plurality of personal mobile terminals 200 by way of a scanning connection, and the Bluetooth connection duration is short and may efficiently perform information interaction with the personal mobile terminal 200 with low power consumption, which is well suited for use in an elevator system to implement an automatic call of elevator for the passenger.

In one embodiment, the authorization management system 30 broadcasts the elevator identifier of its corresponding elevator system 101 using the wireless signal device 120, that is, the wireless signal broadcast by the wireless signal device 120 includes an elevator identifier; the authorization management system 30 also acquires the elevator identifier broadcast by the wireless signal device 120 via the personal mobile terminal 200 carried by the passenger 90, e.g., actively acquiring the elevator identifier in the wireless signal if the personal mobile terminal 200 scans the wireless signal, so that the personal mobile terminal 200 can acquire the elevator identifier very conveniently.

Illustratively, when the passenger 90 walks into the coverage 121 of the wireless signal, the wireless signal would be sensed by way of scanning, at which time the implementation of the interaction between the personal mobile terminal 200 and the wireless signal device 120 begins, a corresponding application or component of the personal mobile terminal 200 (e.g., an automatic call of elevator application) can be triggered or awakened by the communication protocol used by the interaction between the personal mobile terminal 200 and the wireless signal device 120, specifically, if the wireless signal device 120 interacts with the personal mobile terminal 200 based on a Location-Marker protocol, the corresponding application or component of the personal mobile terminal 200 is triggered by a Location-Marker protocol to make a determination operation, that is, an operation to determine whether to have an elevator service request authority of the elevator system.

It will be appreciated that the authorization management system 30 may enable multiple personal mobile terminals 200 to acquire the same elevator identifier at approximately the same time at, for example, the same landing area, without the occurrence of a phenomenon of queuing to acquire an elevator identifier, which makes it simple, convenient and efficient to acquire the identifiers, and may be automatically completed while the personal mobile terminal 200 is in a screen off state.

As shown in FIG. 1, the personal mobile terminal 200 may be various smart terminals having wireless communication functionality (e.g., Bluetooth communication functionality) that facilitates passenger 90 to carry; the personal mobile terminal 200 may be provided with a memory, a processor with computing functionality, or the like, and in particular, the personal mobile terminal 200 may be a smartphone, a wearable smart device (e.g., a smart bracelet, etc.), a personal digital assistant (PDA), and the like, on which a corresponding application or component (e.g., an App) may be installed to implement functions such as authorization requests and/or elevator service requests.

In one embodiment, as shown in FIG. 2, the personal mobile terminal 200 is provided with a short range communication unit 210, which actively acquires an elevator identifier in the wireless signal when scanning the wireless signal broadcast by the wireless signal device 120.

Where the wireless signal device 120 is further used to establish a wireless connection with the personal mobile terminal 200 and to receive an elevator service request command from the personal mobile terminal 200, the short range communication unit 210 may establish a corresponding wireless communication (e.g., Bluetooth connection) with the first wireless signal device 120 when a predetermined condition is satisfied so that interaction with the wireless signal device 120 in the elevator system may be performed e.g. an elevator service request command (e.g., an elevator service request command representing an elevator call) may be sent; to this end, accordingly, the personal mobile terminal 200 is provided with an elevator service request unit 250 configured to automatically send a corresponding elevator service request command (not shown in FIGS. 1 and 2) to the wireless signal device 120 in the elevator system 10 when a predetermined condition is satisfied (e.g., when the signal strength value is greater than or equal to a respective threshold) so that the passenger 90 may implement, for example, an elevator calling request without operation.

Wherein, the elevator service request command generated by the elevator service request unit 250 may include a starting floor, and may also include a starting floor and/or a destination floor, the elevator service request command generated by the elevator service request unit 250 may send a corresponding elevator service request command to the wireless signal device 120 that has established wireless communication with the short range communication unit 210 by the short range communication unit 210.

In one embodiment, as shown in FIG. 1, the authorization management system 30 also determines, by the personal mobile terminal 200, whether to have an elevator service request authority of the elevator system, i.e., the authority of the passenger corresponding to the personal mobile terminal 200, which may be represented in various ways, for example, as a authority to establish a wireless connection with the wireless signal device 120. As shown in FIG. 2, an authority determination unit 220 may be provided in the personal mobile terminal 200 to determine whether to have an elevator service request authority of the elevator system, respective authorization configuration information 290 may be stored corresponding to the authority determination unit 220, the authorization configuration information 290 may perform determination based on the authorization configuration information 290 and the obtained elevator identifier, and illustratively, the authorization configuration information 290 may store the elevator identifier of the authorized elevator system in the form of a list, by comparing the newly acquired elevator identifier to the elevator identifier already stored in the authorization configuration information 290, it is possible to quickly determine whether the elevator system corresponding to the newly acquired elevator identifier has authorized the elevator service request authority to the personal mobile terminal 200.

In one embodiment, the authorization management system 30 also provides, via the personal mobile terminal 200, an input component 230 for the passenger to input an instruction to confirm making the authorization request, as shown in FIG. 2, the personal mobile terminal 200 is provided with an input component 230, which may be controlled according to the determination result of the authority determination unit 220, and if the authority determination unit 220 determines that there is no elevator service request authority of the elevator system, the input component 230 is triggered to provide, for example, an input interface for the passenger to input a corresponding instruction, such as to input an instruction of confirming to make an authorization request, of course, if the passenger do not wish to obtain the respective authority, they may input an instruction to cancel making the authorization request. The specific form of the input interface provided by the input component 230 is not limiting, which may be, for example, an interface with an "OK" and "Cancel" button, thus the passenger can implement the input process described above with one-touch operation.

In one embodiment, the authorization management system 30 also generates corresponding authorization request information via the personal mobile terminal 200. To this end, continue as shown in FIG. 2, an authorization request generation and transmission unit 240 is also provided in the personal mobile terminal 200, the authorization request generation and transmission unit 240 is configured to generate authorization request information and to send the authorization request information based on the instruction of confirming to make the authorization request input by the passenger, wherein the generated authorization request information includes the terminal identifier of the personal mobile terminal 200 and the elevator identifier of the corresponding elevator system acquired by the personal mobile terminal 200, specifically the terminal identifier of the personal mobile terminal 200 is mapped to the elevator identifier, thus facilitating subsequent authorization management operations by the authorization management device 300.

Wherein, the terminal identifier of the personal mobile terminal 200 may identify the personal mobile terminal 200 so that the passenger 90 using the personal mobile terminal 200 may be identified; The terminal identifier may specifically be a communication number (e.g., a cell phone number when the personal mobile terminal 200 is a cell phone), the terminal identifier may also be the unique identification code of the personal mobile terminal 200, and may even be the identity identification (ID) of the passenger 90 using the personal mobile terminal 200.

In one embodiment, the authorization management system 30 also reminds the passenger to perform the above described input operations via the personal mobile terminal 200; illustratively, if there is no elevator service request authority of the elevator system, the authorization request generation and transmission unit 240 is further configured to drive a sounding component or the like to send remind information that reminds the passenger to input an instruction to confirm whether to make an authorization request, the remind information, for example, may be implemented in the form of sound and/or vibration.

In one embodiment, the authorization request generation and transmission unit 240 is further configured to establish a mapping relationship between the acquired elevator identifier and the terminal identifier of the personal mobile terminal 200 such that the terminal identifier is mapped to the elevator identifier, or the elevator identifier is mapped to the terminal identifier, e.g., establishing a mapping relationship between the elevator identifier acquired by scanning the wireless signal and the communication number of the personal mobile terminal 200, thereby establishing corresponding authorization request information. It will be appreciated that when the terminal identifier is mapped to an elevator identifier, it is also represented that the elevator identifier is mapped to the terminal identifier, establishing a mapping relationship between them, facilitating subsequent authorization management.

In an embodiment, the generated authorization request information may also include the floor to which the request input by the input component is authorized, and may also include the identity credential information of the passenger 90 (e.g., an identity card, an work permit, etc. previously stored in the personal mobile terminal 200), or may, of course, be obtained instantaneously by, for example, the input component 230 and/or the acquisition unit 220. The identity credential information facilitates the management personnel to quickly determine whether to allow authorization based on the authorization request information.

It is noted that the personal mobile terminal 200 may establish a communication connection with the authorization management device 300 through various types of wireless networks such that the authorization request generation and transmission unit 240 of the personal mobile terminal 200 may send the authorization request information to the authorization management device 300 corresponding to the elevator system 10 in real time.

Continuing with FIGS. 1 and 2, the authorization management device 300 may be implemented by various types of computer devices, such as through a cloud server. The authorization management device 300 may be disposed in a building or may be remotely disposed elsewhere, the disposing location of the authorization management device 300 is not limiting. The authorization management of the plurality of elevator systems 101 may be implemented by an authorization management device 300. In an embodiment, the authorization management device 300 may be disposed in the property management system of the building in which the elevator system is located, facilitating the authorization management of the elevator service request implemented by the property management personnel.

As shown in FIG. 2, authorization management device 300 may be provided with receiving unit 310 configured to receive authorization request information from each personal mobile terminal 200 (e.g., to communicate authorization request information via the established communication connection between personal mobile terminal 200 and authorization management device 300) such that authorization request information may be centrally processed in authorization management device 300.

As shown in FIG. 2, in the authorization management device 300 is further provided an authorization management unit 320 configured to determine whether the authorization request information from the corresponding personal mobile terminal 200 is allowed to be authorized based at least on the mapping relationship between the elevator identifier in the authorization request information and the terminal identifier of the personal mobile terminal 200. It should be noted that the specific authorization manner is not limiting, e.g., corresponding operation may be performed on the authorization request information in a manual manner one by one or in batch to allow authorization or deny authorization.

Continuing with FIGS. 1 and 2, after completion of the authorization operation in the authorization management device 300, the authorization management device 300 will return an "authorization result" to the personal mobile terminal 200, e.g., authorized or unauthorized. The personal mobile terminal 200 may display or present the authorization result.

In an embodiment, as shown in FIG. 2, the personal mobile terminal 200 may also store authorization results, and the authorization request generation and transmission unit 240 of the personal mobile terminal 200 also determines whether the elevator system corresponding to the currently acquired elevator identifier has been authorized based on the stored authorization results, not generating or transmitting authorization request information corresponding to the currently acquired elevator identifier if it is determined that the authorization has been made, such that repeated requests are avoided.

If the authorization result received by the personal mobile terminal 200 is "authorization allowed", the personal mobile terminal 200 may also obtain corresponding communication parameters from the authorization management device 300 to configure, for example, the short range communication unit 210 so that the personal mobile terminal 200 may automatically establish a wireless communication connection (e.g., a Bluetooth connection) with the wireless signal device 120 through the short range communication unit 210, thereby automatically accomplish the elevator service request.

In one embodiment, as shown in FIG. 1, the authorization management unit 320 of the authorization management device 300 is further used to determine whether the received authorization request information is an invalid request; for example, if it is a repeated request for the same terminal identifier and the same elevator identifier, it is determined as an invalid request, and also for example may also determine that the authorization request information is an invalid request, e.g., if the authorization request information includes an elevator identifier of an elevator system that is not running, or floor information that is not within the operating range of the respective elevator system, the authorization request information may also be determined as an invalid request. If it is determined as an invalid request, the authorization management unit 320 may filter out the invalid request, e.g., the invalid authorization request information is not presented in the list, avoiding invalid authorization operations.

Note that in the authorization management system 30, if the determination result of the authority determination unit 220 is that the personal mobile terminal 200 has the elevator service request authority of the elevator system, the corresponding operation is not performed by the input component 230, the authorization request generation and transmission unit 240, etc., and the corresponding elevator service request operation is performed directly through the elevator service request unit 250.

The authorization management system 30 of the above embodiment may actively acquire the elevator identifier by the personal mobile terminal 200, fewer operations by the passenger are required (e.g., only simple input operations to confirm the authorization request is enough), the generation of the elevator identifier, generation and transmission of the authorization request information is convenient and simple, and the experience of the elevator authorization request process is greatly improved, moreover, an invalid repeated authorization request can be effectively avoided, and the authorization management becomes more efficient.

FIG. 3 is a flowchart of an authorization management method for an elevator service request according to an embodiment of the invention. In the authorization management method of this embodiment, an authorization request method that may be completed in the personal mobile terminal 200 of an embodiment is also shown.

The authorization management method and the authorization request method are described below exemplarily in connection with FIGS. 1-3.

In step S410, a wireless signal containing an elevator identifier of the elevator system is broadcast by a wireless signal device 120 installed in an elevator landing area of the elevator system; correspondingly, in this step, the personal mobile terminal 200 entering the coverage 121 of the wireless signal as shown in FIG. 1 will automatically scan the wireless signal.

In step S420, upon scanning the wireless signal, the corresponding application of the personal mobile terminal 200 is activated, e.g., activated by a Location-Marker protocol.

In step S430, the personal mobile terminal 200 actively acquires an elevator identifier in the wireless signal if it scans the wireless signal.

In step S440, whether to have an elevator service request authority of the elevator system is determined based on the elevator identifier and the stored authorization configuration information 290. This step 440 may be accomplished by the authority determination unit 220 of the personal mobile terminal 200. If it is determined "yes", it represents that an elevator service request operation may be performed automatically, e.g., proceed directly to the following step S550; and if it is determined "no", it represents that the passenger does not currently have the corresponding elevator service request authority, and proceeds to step S450. Steps S410 to S420 above may be done automatically for the personal mobile terminal 200, for example, automatically in a screen off state.

In step S450, if there is no elevator service request authority of the elevator system, an input component 230 is provided for the passenger to input an instruction of confirming to make the authorization request, such as displaying a corresponding input interface on the personal mobile terminal 200. In this step S450, the passenger's input instruction may also be received, e.g., an instruction to confirm making the authorization request, or an instruction to cancel making the authorization request may be received.

In step S460, generating corresponding authorization request information based on the instruction of confirming to make the authorization request input by the passenger, wherein the authorization request information includes the terminal identifier of the personal mobile terminal 200 and the elevator identifier of the corresponding elevator system. In this step, the mapping relationship between the acquired elevator identifier and the terminal identifier can be established firstly, and then the authorization request information containing the mapping relationship can be generated, so that the authorization operation can be conveniently carried out at one end of the authorization management device.

In step S470, the authorization request information is sent to the authorization management device 300, and accordingly, the authorization management device 300 receives the authorization request information from the one or more personal mobile terminals 200.

The above steps S420 to S470 illustrate the main process of an authorization request, and by repeating steps S420 to S470 above, multiple authorization requests may be completed, such as authorization requests for different floors of the same elevator, authorization requests for different elevators, and even authorization requests for different periods of the same elevator (e.g., authorization requests are again made after authorization fails). It will be understood that the overall authorization request process is simple, convenient, and providing good passenger experience.

Further, in step S480, whether the authorization request information is an invalid request is determined, and if it is determined as "yes", the authorization request information is filtered out, the authorization management process is ended, and if it is determined as "no", enter the step S490.

In step 490, a determination is made as to whether the authorization request information from the corresponding personal mobile terminal 200 is allowed to be authorized according to the mapping relationship between the elevator identifier and the terminal identifier in the authorization request information. In this step, authorization request information is displayed on the list first, e.g. multiple authorization request information is displayed by way of listing, and the mapping relationship between the elevator identifier and the terminal identifier will also be intuitively presented in the front of the management personnel, and the management personnel are easy to carry out authorization operation according to the existing information; a determination is then made as to whether the authorization request information from the corresponding personal mobile terminal is allowed to be authorized.

In step S500, the authorization result is returned to the corresponding personal mobile terminal 200. The personal mobile terminal 200 may display or present the authorization result to the passenger, the authorization result may be "allow authorization", or "deny authorization".

In step S510, the personal mobile terminal 200 may request to obtain a communication parameter from the authorization management device 300 if the received authorization result is "allow authorization".

In step S520, in response to the request of step S510, the authorization management device 300 transmits a corresponding communication parameter to the personal mobile terminal 200, wherein the communication parameter can be used by the personal mobile terminal 200 to establish a communication connection with the wireless signal device 120 automatically.

In step S530, the authorization configuration information 290 stored by the personal mobile terminal 200 is updated based on the received authorization result and/or the communication parameters. It will be understood that the updated authorization configuration information 290 may be used in step S440 of a subsequent authorization request process.

At this point, the authorization management method of the elevator service request according to an embodiment of the present invention substantially ends. In the event the personal mobile terminal 200 obtains an authorization result of "allow authorization", the process may automatically proceed to step S540, i.e., a wireless connection is established with the wireless signal device 120 and a corresponding elevator service request is sent, so that the elevator service request operation can be completed automatically.

It will be understood that in the authorization management method of the elevator service request of the above example, the step S490 can be performed for one or a batch of authorization request information, the whole authorization management process is simple and efficient, facilitating the authorization management operation by the management personnel. Moreover, in the authorization request process of the above example, the passenger only needs to do a simple input operation without the elevator service request authority of the elevator system, thus the process is simple and provides good passenger experience, and the invalid authorization request information can be automatically prevented from being sent with the elevator service request authority of the elevator system.

It is noted that, the personal mobile terminal 200 of the above embodiments of the present invention may be implemented by computer program instructions, for example, by a dedicated APP, these computer program instructions may be provided to a processor of a general purpose computer, a dedicated computer, or other programmable data processing device to constitute the personal mobile terminal 200 of an embodiment of the present invention, also, these instructions, which are executed by a processor of a computer or other programmable data processing device, may create units or components for implementing the functions/operations specified in the flowcharts and/or blocks and/or one or more flow diagrams.

It is noted that, the authorization management device 300 of the above embodiments of the present invention may be implemented by computer program instructions, for example, by dedicated computer program, these computer program instructions may be provided to a processor of a general purpose computer, a dedicated computer, or other programmable data processing device to constitute the authorization management device 300 of an embodiment of the present invention, also, these instructions, which are executed by a processor of a computer or other programmable data processing device, may create units or components for implementing the functions/operations specified in the flowcharts and/or blocks and/or one or more flow diagrams.

Furthermore, these computer program instructions may be stored in a computer-readable memory, these instructions may indicate a computer or other programmable processor to perform functions in a particular manner such that these instructions stored in the computer-readable memory constitute a fabrication product that contains the instruction components implementing the functions/operations specified in one or more blocks of the flowcharts and/or block diagrams.

It should also be noted that, in some alternative implementations, the functions/operations shown in FIG. 3 may occur out of the order shown in the flowcharts. For example, as a matter of fact, steps shown in succession may in some cases be executed substantially concurrently or some blocks may sometimes be executed in the reverse order, depending upon the function/operation involved.

It is noted that elements disclosed and depicted herein (including flow diagrams, block diagrams in the figures) mean logical boundaries between elements. However, according to software or hardware engineering practice, the depicted elements and their functions may be executed on a machine by a computer executable medium having a processor capable of executing program instructions stored thereon as a monolithic software structure, as a stand-alone software module, or as a module using external programs, code, services, etc., or any combination thereof, and all such execution schemes may fall within the scope of the present disclosure.

Although the different non-limiting implementations have particular illustrated components, implementations of the invention are not limited to these particular combinations. It is possible to use some of the components or features from any of the non-limiting implementations in combination with features or components from any other non-limiting embodiment.

Although particular order of steps is shown, disclosed, and claimed, it is to be understood that the steps may be performed in any order, separated or combined unless otherwise indicated and still benefit from the present disclosure.

The foregoing description is exemplary and is not defined to be limited thereto. Various non-limiting implementations are disclosed herein, however, one of ordinary skill in the art will recognize that various modifications and alternations will fall within the scope of the appended claims in light of the above teachings. It is, therefore, to be understood that within the scope of the appended claims, the disclosure may be practiced otherwise than as specifically disclosed. For this reason, the appended claims should be studied to determine the true scope and content.

What is claimed is:

1. An authorization management system for an elevator service request, the authorization management system comprising:

a wireless signal device mounted in an elevator landing area of an elevator system;

wherein the wireless signal device is operable to broadcast a wireless signal having a coverage area and containing an elevator identifier of the elevator system;

wherein the wireless signal device is operable to automatically provide the wireless signal containing the elevator identifier to a personal mobile terminal that is within the coverage area and scans for the wireless signal;

wherein the personal mobile terminal is operable to, based on the elevator identifier and stored authorization configuration information, make a determination of whether or not to have an elevator service request authority of the elevator system;

wherein the determination of whether or not to have the elevator service request authority of the elevator system comprises using an input components of the personal mobile terminal to prompt a passenger to input a passenger instruction on whether or not to have the elevator service request authority of the elevator system;

wherein the personal mobile terminal is operable to, responsive to the passenger instruction, generate authorization request information containing a terminal identifier of the personal mobile terminal and an elevator identifier of a corresponding elevator system acquired by the personal mobile terminal based on the passenger instruction; and an authorization management device;

wherein the authorization management device is operable to receive the authorization request information.

2. The authorization management system of claim 1, wherein the personal mobile terminal is operable to send remind information to remind the passenger to input the passenger instruction.

3. The authorization management system of claim 1, wherein:
the wireless signal device interacts with a Location-Marker protocol of the personal mobile terminal;
if the wireless signal is scanned, a respective application of the personal mobile terminal is activated by the Location-Marker protocol to perform an operation that supports the determination of whether or not to have the elevator service request authority of the elevator system.

4. The authorization management system of claim 1, wherein the authorization management device comprises:
a receiving unit configured to receive the authorization request information from one or more of the personal mobile terminals, wherein the authorization request information includes the elevator identifier and a terminal identifier of the personal mobile terminal that is mapped to the elevator identifier; and
an authorization management unit configured to determine whether authorization request information from the corresponding personal mobile terminal is allowed to be authorized based at least on a mapping relationship between the elevator identifier and the terminal identifier in the authorization request information.

5. The authorization management system of claim 1, wherein the authorization management device is operable to return to the personal mobile terminal authorization results corresponding to the authorization request information.

6. The authorization management system of claim 5, wherein the personal mobile terminal is operable to update the stored authorization configuration information based on the authorization results or corresponding communication parameters received from the authorization management device.

7. The authorization management system of claim 1, wherein the authorization management device transmits corresponding communication parameters to the personal mobile terminal if it is determined that the authorization request information of the personal mobile terminal is allowed to be authorized, wherein the personal mobile terminal is operable to use the corresponding communication parameters to automatically establish a communication connection with the wireless signal device.

8. The authorization management system of claim 1, wherein the wireless signal device is further used to establish a wireless connection with the personal mobile terminal to receive an elevator service request command from the personal mobile terminal.

9. The authorization management system of claim 1, wherein the wireless signal device is a Bluetooth module or a Bluetooth Low Energy (BLE) module for broadcasting a Bluetooth Low Energy signal as the wireless signal.

10. An authorization management method for implementing an elevator service request, the authorization management method comprising:
broadcasting, by a wireless signal device installed in an elevator landing area of an elevator system, a wireless signal containing an elevator identifier of the elevator system;
wherein the elevator identifier in the wireless signal is automatically acquired by a personal mobile terminal that scans for the wireless signal;
wherein the personal mobile terminal is operable to, based on the elevator identifier and stored authorization configuration information, make a determination of whether or not to have an elevator service request authority of the elevator system;
wherein the determination of whether or not to have the elevator service request authority of the elevator system comprises using an input components of the personal mobile terminal to prompt a passenger to input a passenger instruction on whether or not to have the elevator service request authority of the elevator system;
wherein the personal mobile terminal is operable to, responsive to the passenger instruction, generate authorization request information containing a terminal identifier of the personal mobile terminal and an elevator identifier of a corresponding elevator system acquired by the personal mobile terminal based on the passenger instruction; and
receiving, using an authorization management device, the authorization request information.

11. The authorization management method of claim 10, wherein the personal mobile terminal is operable to send remind information to remind the passenger to input the passenger instruction.

12. The authorization management method of claim 10, wherein, if the wireless signal is scanned, a respective application of the personal mobile terminal is activated by a Location-Marker protocol to perform an operation that supports the determination of whether or not to have the elevator service request authority of the elevator system.

13. The authorization management method of claim 10, further comprising:
receiving, using the authorization management device, the authorization request information from one or more of the personal mobile terminals, wherein the authorization request information includes the elevator identifier and a terminal identifier of the personal mobile terminal that is mapped to the elevator identifier; and
determining, using the authorization management device, whether the authorization request information from the corresponding personal mobile terminal is allowed to be authorized based at least on a mapping relationship between the elevator identifier and the terminal identifier in the authorization request information.

14. The authorization management method of claim 10, further comprising returning to the personal mobile terminal, using the authorization management device, authorization results corresponding to the authorization request information.

15. The authorization management method of claim 14, wherein the personal mobile terminal is operable to update the stored authorization configuration information based on the authorization results or corresponding communication parameters received from the authorization management device.

16. The authorization management method of claim 10, further comprising using the authorization management device to transmit corresponding communication parameters to the personal mobile terminal if it is determined that the authorization request information of the personal mobile terminal is allowed to be authorized, wherein the personal mobile terminal is operable to use the corresponding communication parameters to automatically establish a communication connection with the wireless signal device.

17. The authorization management method of claim 10, wherein the wireless signal is a Bluetooth Low Energy signal.

18. An authorization request method for an elevator service request, the authorization request method comprising:
    using a personal mobile terminal to automatically acquire an elevator identifier in a wireless signal based on the personal mobile terminal scanning for the wireless signal while the personal mobile terminal is within a coverage area of the wireless signal;
    using the personal mobile terminal to, based on the elevator identifier and stored authorization configuration information, make a determination of whether or not to have an elevator service request authority of the elevator system;
    wherein the determination of whether or not to have the elevator service request authority of the elevator system comprises using an input components of the personal mobile terminal to prompt a passenger to input a passenger instruction on whether or not to have the elevator service request authority of the elevator system; and
    using the personal mobile terminal to, responsive to the passenger instruction, generate authorization request information containing a terminal identifier of the personal mobile terminal and an elevator identifier of a corresponding elevator system acquired by the personal mobile terminal based on the passenger instruction.

19. The authorization request method of claim 18, further comprising sending the authorization request information to an authorization management device.

20. The authorization request method of claim 19, further comprising:
    returning to the personal mobile terminal, using the authorization management device, authorization results corresponding to the authorization request information; and
    using the personal mobile terminal to update the stored authorization configuration information based on the authorization results or corresponding communication parameters received from the authorization management device.

21. The authorization request method of claim 18, wherein the personal mobile terminal is operable to send remind information to remind the passenger to input the passenger instruction.

22. The authorization request method of claim 18, wherein, if the wireless signal is scanned, a respective application of the personal mobile terminal is activated by a Location-Marker protocol to perform an operation that supports the determination of whether or not to have the elevator service request authority of the elevator system.

* * * * *